(12) United States Patent
Lee et al.

(10) Patent No.: US 11,101,953 B2
(45) Date of Patent: Aug. 24, 2021

(54) UPLINK TRANSMISSIONS USING PRECODED SOUNDING REFERENCE SIGNALS FOR COMMUNICATION SYSTEMS

(71) Applicant: Apple Inc., Cupertino, CA (US)

(72) Inventors: Wook Bong Lee, Pleasanton (CA); Alexei Davydov, Nizhny Novgorod (RU); Yushu Zhang, Beijing (CN); Victor Sergeev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/473,579

(22) PCT Filed: Feb. 5, 2018

(86) PCT No.: PCT/US2018/016880
§ 371 (c)(1),
(2) Date: Jun. 25, 2019

(87) PCT Pub. No.: WO2018/145013
PCT Pub. Date: Aug. 9, 2018

(65) Prior Publication Data
US 2020/0153576 A1    May 14, 2020

Related U.S. Application Data
(60) Provisional application No. 62/455,195, filed on Feb. 6, 2017.

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0486* (2013.01); *H04W 24/08* (2013.01); *H04W 72/04* (2013.01)

(58) Field of Classification Search
None
See application file for complete search history.

(56) References Cited

U.S. PATENT DOCUMENTS

| 2016/0211895 A1* | 7/2016 | Onggosanusi | ....... H04B 7/0404 |
| 2017/0201300 A1* | 7/2017 | Parkvall | ............ H04W 36/0005 |

(Continued)

FOREIGN PATENT DOCUMENTS

WO    2016/114696 A1    7/2016

OTHER PUBLICATIONS

International Search Report dated Apr. 18, 2018 for International Application No. PCT/US2018/016880.

(Continued)

*Primary Examiner* — Clemence S Han
(74) *Attorney, Agent, or Firm* — Eschweiler & Potashnik, LLC

(57) ABSTRACT

An apparatus is configured to be employed within a base station. The apparatus comprises baseband circuitry which includes a radio frequency (RF) interface and one or more processors. The one or more processors are configured to generate control information, the control information including a configured number of ports; receive a plurality of sounding reference signals (SRS) via the RF interface from a user equipment (UE) device, wherein each of the plurality of SRS is associated with one of the one or more precoders; and generate a ranking of a the one or more precoders based on the received plurality of SRS, wherein the plurality of SRS are associated with the one or more precoders.

18 Claims, 6 Drawing Sheets

(51) Int. Cl.
*H04B 7/0456* (2017.01)
*H04W 24/08* (2009.01)
*H04W 72/04* (2009.01)

(56) References Cited

U.S. PATENT DOCUMENTS

| | | | |
|---|---|---|---|
| 2018/0062724 A1* | 3/2018 | Onggosanusi | H04B 7/0413 |
| 2018/0097595 A1* | 4/2018 | Huang | H04L 5/0037 |
| 2018/0097663 A1* | 4/2018 | Jiang | H04L 5/005 |
| 2018/0359013 A1* | 12/2018 | Lee | H04B 7/0469 |
| 2019/0124534 A1* | 4/2019 | Yum | H04B 7/063 |
| 2019/0199553 A1* | 6/2019 | Park | H04B 7/0617 |

OTHER PUBLICATIONS

"WF on UL MIMO transmission." Huawei, HiSilicon, Intel. 3GPP TSG RAN WG1 NR Ad Hoc Meeting, Spokane, USA, Jan. 16-20, 2017, Agenda item: 5.1.2.1. R1-1701398. 4 pages.

"Discussion on UL-MIMO." Source: LG Electronics. Agenda Item: 5.1.2.1. 3GPP TSG RAN WG1 NR Ad-Hoc Meeting, Spokane, USA, Jan. 16-20, 2017. R1-1700467. 6 pages.

International Preliminary Report on Patentability dated Aug. 16, 2019 for International Application No. PCT/US2018/016880.

* cited by examiner

UPLINK TRANSMISSIONS USING PRECODED SOUNDING REFERENCE SIGNALS FOR COMMUNICATION SYSTEMS

REFERENCE TO RELATED APPLICATIONS

This application is a National Phase entry application of International Patent Application No. PCT/US2018/016880 filed Feb. 5, 2018, which claims priority to U.S. Provisional Application No. 62/455,195 filed Feb. 6, 2017, entitled "METHOD AND/OR APPARATUS FOR NON CODE-BOOK BASED UL TRANSMISSION BASED ON PRE-CODED SRS" in the name of Wook Bong Lee et al. and is hereby incorporated by reference in its entirety.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

The communication between devices can utilize various resources including antenna ports and precoders. Selection of the various resources can be time consuming and/or problematic. Further, improper selection can waste resources and/or negatively impact data rate and reliability.

What are needed are techniques to facilitate handling uplink transmissions and a suitable allocation of resources for uplink transmissions.

DETAILED DESCRIPTION

Figure 1:
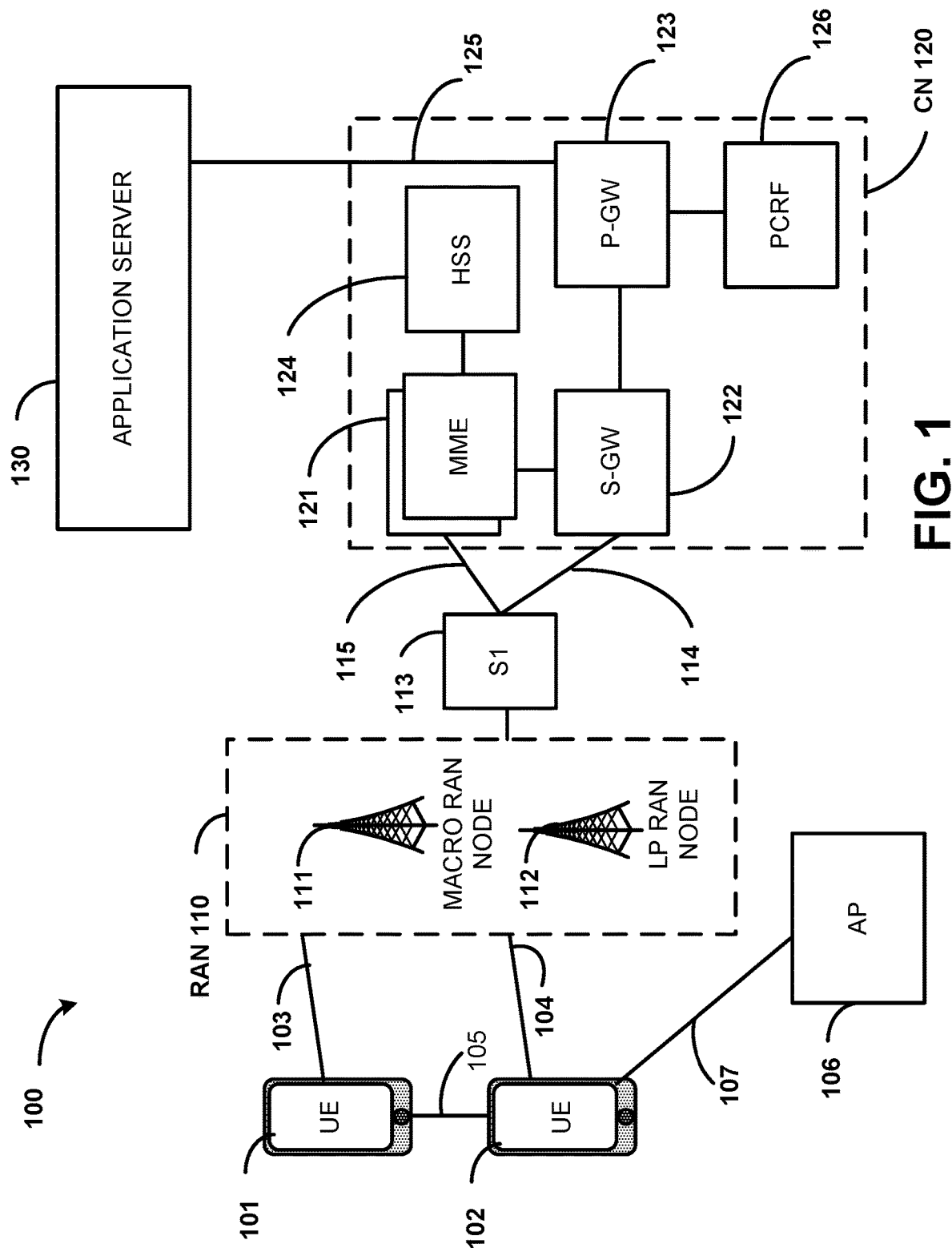
FIG. 1 illustrates a block diagram of an example wireless communications network environment for a network device (e.g., a UE, gNB or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1 and 5G.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It is appreciated that there is a continuing need to improve data rates and performance. Techniques for improving data rates can include lowering overhead and/or better utilizing resources.

Wireless communication systems can involve nodes, such as a base station, communicating with devices, such as user equipment (UE) devices. The nodes can also include evolved Node Bs (eNBs), gNBs, and the like. The systems utilize downlink (DL) communications from the base stations to the UE devices and uplink (UL) communications from the UE devices to the base stations. Various techniques and schemes can be used for uplink and downlink communications.

Agreements have been made under the 3rd Generation Partnership Project (3GPP) to support uplink transmission schemes for data in New Radio Access Technology (NR). One scheme is scheme A, which is a codebook based UL transmission.

This scheme supports frequency selective precoding for CP-OFDM when the number of transmission port is greater than X (FFS: Value of X). The codebook design include single-stage and multi-stage, e.g., W1W2 structure, codebook.

Another scheme is Scheme B, which is a non-codebook based UL transmission. The Scheme B provides:

Support frequency selective precoding for CP-OFDM when the number of transmission port is greater than Y (FFS: Value of Y).

Support the indication of DL measurement reference signal (RS) for UE to calculate a candidate precoder.

Study the mechanisms for UL precoder determination, e.g. precoded sounding reference signal (SRS) based, non-precoded SRS based, hybrid precoded and non-precoded SRS based Diversity-based transmission schemes.

For further study (FFS): Whether the scheme has specification impact or not.

FFS: Merging of the schemes.

Support rank determination by gNB.

Support physical resource block (PRB) bundling for Cyclic Prefix-Orthogonal Frequency Division Multiplexing (CP-OFDM).

Study configurability of Precoding Resource Group (PRG) size for CP-OFDM.

Study the PRG size.

FFS: Single port transmission is supported for the UE capable for multiple antenna port transmission.

In case of non-codebook based UL transmission or diversity-based transmission schemes without specification impact, MCS selection can be done by a precoded SRS for a given rank. However, there is no known method to enable rank-adaptation for these category of uplink transmission scheme.

Embodiments are disclosed that support non-codebook based uplink transmissions and schemes. The embodiments include determining precoders for uplink transmissions using sounding reference signals (SRS) and the like.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It is appreciated that an MTC physical downlink control channel (MPDCCH) and/or an enhanced physical downlink control channel (EPDCCH) can be used in placed of the PDCCH. The It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
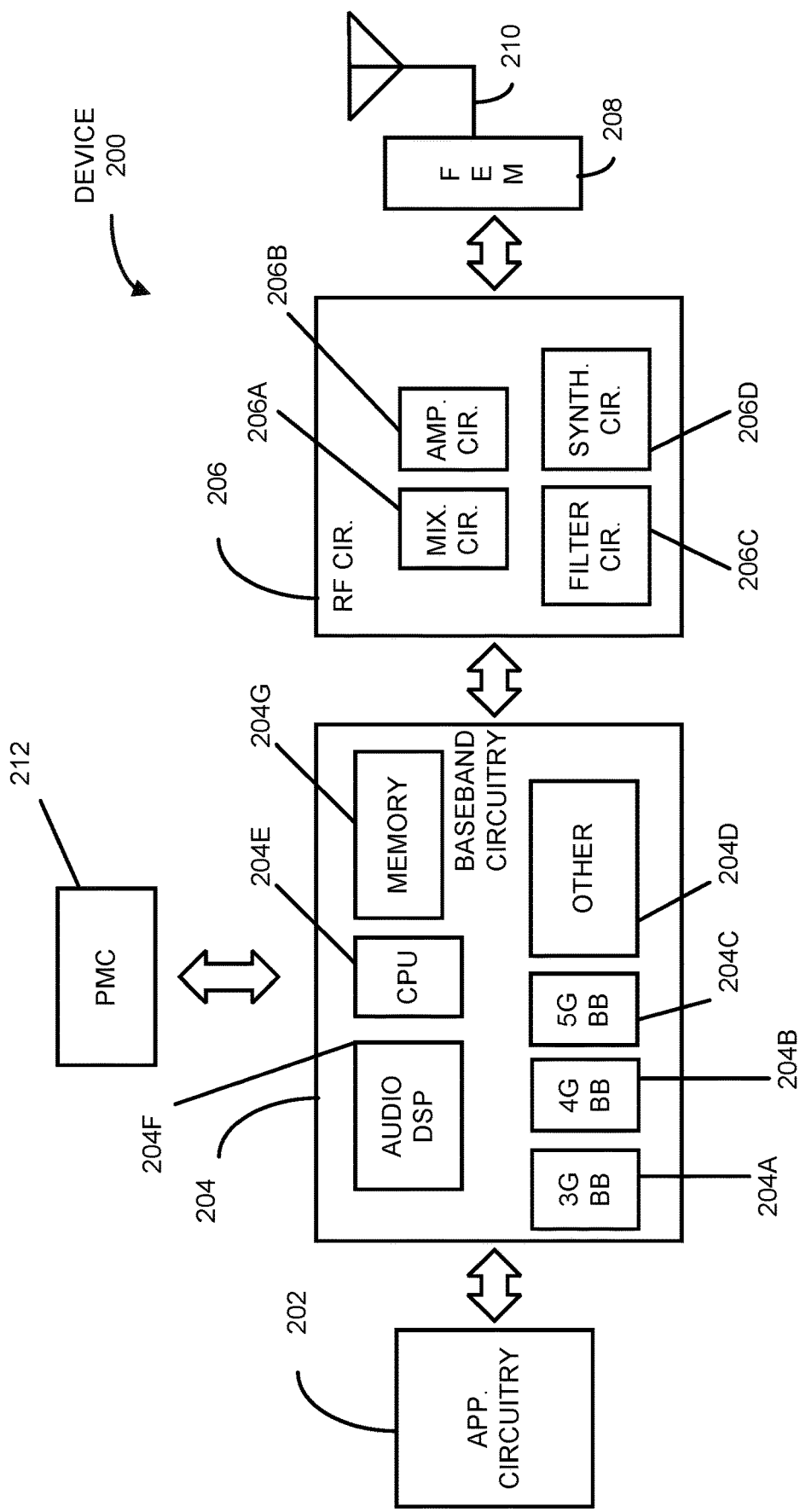
FIG. 2 illustrates another block diagram of an example of wireless communications network environment for a network device (e.g., a UE, gNB or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
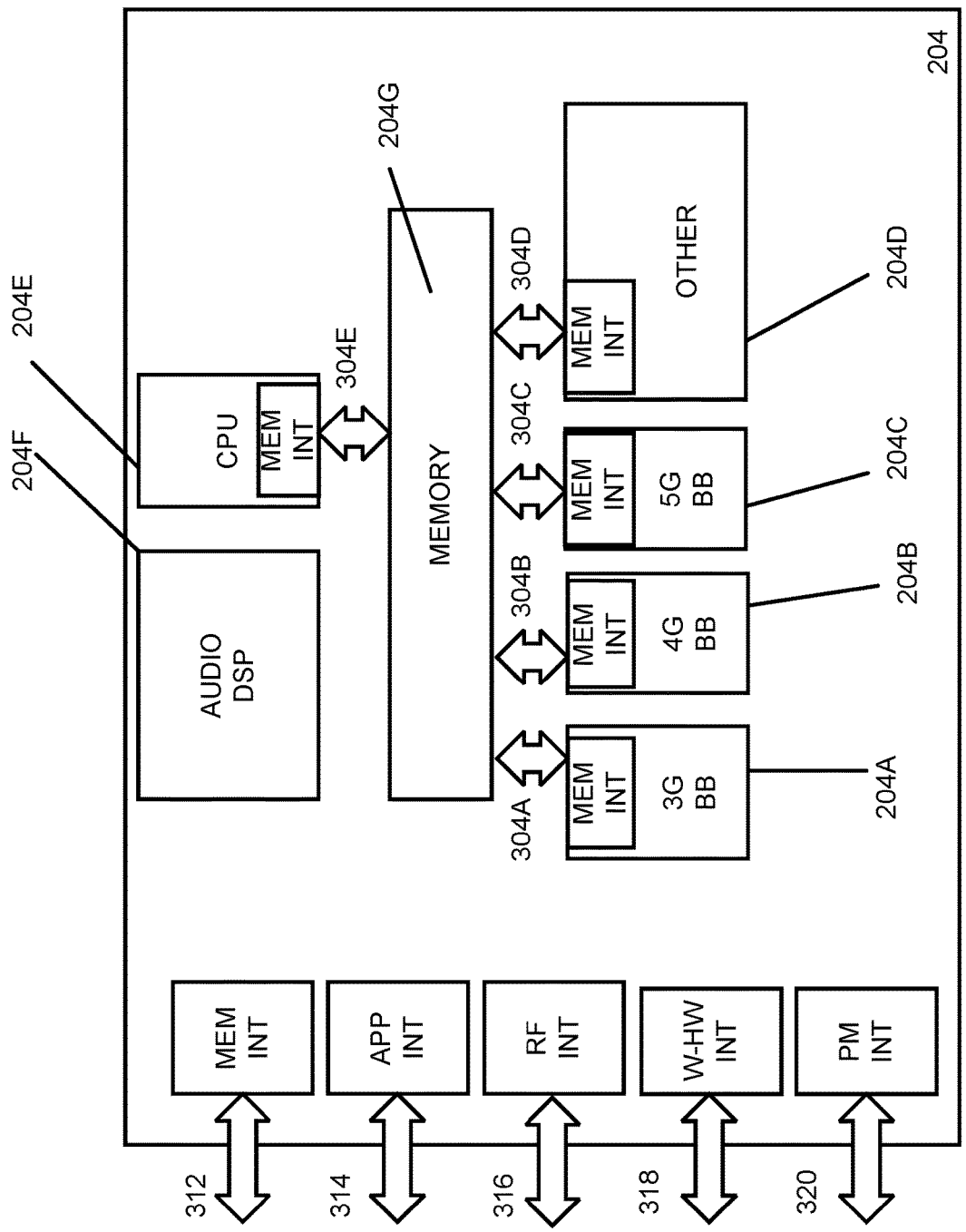
FIG. 3 another block diagram of an example of wireless communications network environment for network device (e.g., a UE, gNB or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
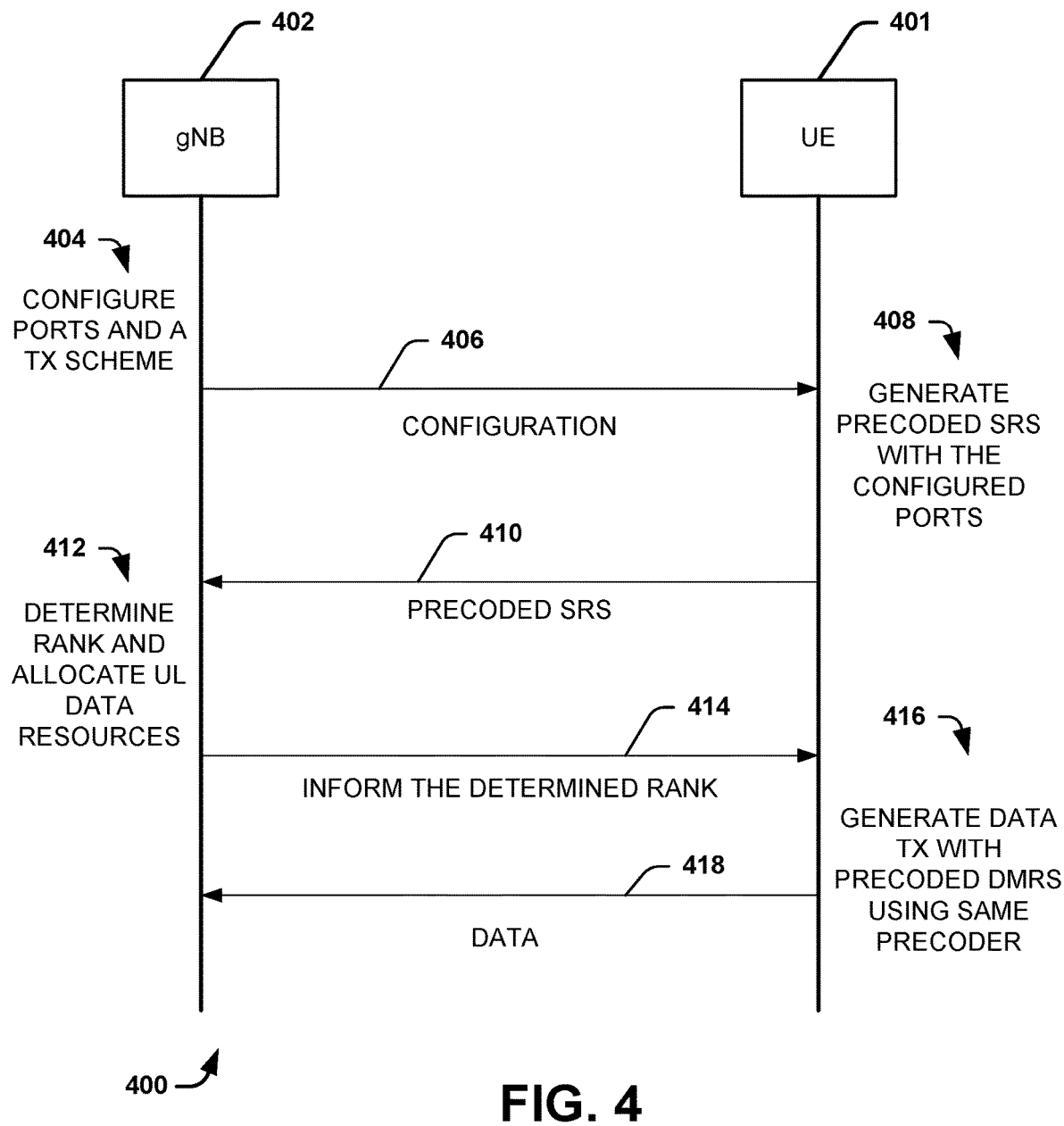
FIG. 4 is a diagram illustrating an architecture of a system utilizing non-codebook precoders for uplink transmissions in accordance with some embodiments.

FIG. 4 is a diagram illustrating an architecture of a system 400 utilizing non-codebook precoders for uplink transmissions in accordance with some embodiments. The system or apparatus 400 can be utilized with the above embodiments and variations thereof, including the system 100 described above. The system 400 is provided as an example and it is appreciated that suitable variations are contemplated.

The system 400 includes a network device 401 and a node 402. The device 401 is shown as a UE device and the node 402 is shown as gNB for illustrative purposes. It is appreciated that the UE device 401 can be other network devices, such as APs, ANs and the like. It is also appreciated that the gNB 402 can be other nodes or access nodes (ANs), such as BSs, eNB, gNB, RAN nodes and the like. Other network or network devices can be present and interact with the device 401 and/or the node 402. Operation of the device 401 and/or the node 402 can be performed by circuitry, such as the baseband circuitry 204, described above.

Downlink (DL) transmissions occur from the gNB 402 to the UE 401 whereas uplink (UL) transmissions occur from the UE 401 to the gNB 402. The downlink transmissions utilize a DL control channel and a DL data channel. The uplink transmissions utilize an UL control channel and a UL data channel. The various channels can be different in terms of direction, link to another gNB, eNB and the like.

The UE 401 is one of a set or group of UE devices assigned to or associated with a cell of the gNB 402.

The UE 401 can generate UL transmissions to the gNB 402 using a codebook based approach or scheme and/or a non-codebook based approach or scheme. For the codebook scheme, the UE 401 uses channel state information and the codebook to precode information or data for UL transmissions. The gNB 402 can provide a precoding matrix (PMI) to the UE 401.

For the non-codebook approach/scheme, shown below, the system 400 uses sounding reference signals (SRS) to rank and to select precoders and then use the selected precoders for uplink data transmission. It is appreciated other transmission schemes can be used.

For the non-codebook approach, the gNB 402 configures a number of ports for precoded sounding reference signals (SRS) transmission at 404. In one example, the gNB 402 determines a number or maximum number of ports based on a selected rank or ranking process to be used.

Additionally, the gNB 402 can also configure a transmissions scheme at 404 that can determine one or more precoders to facilitate precoder selection at the UE 401. An example of a suitable transmission scheme is a reciprocity based precoding, diversity-based transmission scheme, semi-open loop transmission scheme and the like. It is appreciated that other suitable transmission schemes are contemplated.

In the case of the reciprocity based precoding scheme, the UE 401 determines the precoders based on a downlink reference signal. For the diversity-based transmission scheme, the UE 401 determines the precoders based on pre-stored information (e.g., precoders to cover spatial spaces, and applying different precoders to different frequency/subcarrier indices, a.k.a. precoder cycling). In another example, precoders for different frequency/subcarrier indices can be defined in specification.

For the semi-open loop transmission scheme, the UE 401 determines the precoders based on prior information from gNB 402, referred to as wideband precoder information. In this case, to further provide diversity, the UE 401 can apply different co-phase values to different polarized antennas for different frequency/subcarrier indices.

In other examples, the UE 401 can apply slightly different precoding vector(s), which are closer to the wideband precoder for different frequency/subcarrier indices.

Additionally the gNB 402 can configure a precoding resource group (PRG) size. The PRG size is a maximum number adjacent PRBs that can be used for channel estimation. The precoder(s) should be contiguous (or fixed) in a given PRG/or set of subcarriers. The size of PRG can be specified or preconfigured based on transmission scheme.

The gNB 402 informs the UE of the configured/available ports and the configured transmission scheme at 406. As shown above, the transmission scheme can include the one or more precoders. The configured ports and the configured transmission scheme are provided as control information using a physical control channel, such as a physical downlink control channel (PDCCH), MPDCCH and the like. The control information can be at least partially provided in a downlink control information (DCI) and/or higher layer signaling, such are radio resource control (RRC) signaling.

The UE 401 generates precoded SRS using the configured number of ports or the configured ports at 408. The precoded SRS are generated using the configured number of ports, the one or more precoders, and one or more antenna ports at the UE 401.

The UE 401 can determine a number of SRS to generate based on UE resources including the one or more precoders, the UE antenna ports, the configured SRS antenna ports by gNB 402, and the like. The one or more precoders can include additional precoders not supplied by the gNB 402 or the one or more precoders can include only precoders supplied by the UE 401. Further, the one or more precoders can be from a list of available precoders, predetermined, and/or dynamically determined.

In one example, the UE 401 selects a precoder for each configured SRS port based on configured transmission scheme. It is also appreciated that the same precoder can be used for all ports or the precoder can vary. A plurality of SRS are generated using the one or more precoder(s) and the like and transmitted at 410.

The UE 401 determines the one or more precoders using a suitable approach. In one example, for a spatial multiplexing based transmission scheme where number of port equals to rank of transmission, the UE 401 determines the one or more precoder(s) by assuming port 0 is for rank-1, port 0 to 1 is for rank-2, port 0 to R-1 is for rank-R, where R is the number of the configured ports or number of ranks.

In another example for Space Frequency Block Codes (SFBC) and SM adaptation, the UE 401 determines the one or more precoder(s) by assuming port 0 and port 1 is for rank-1 SFBC, port 0 to 1 is for rank-2, port 0 to R-1 is for rank-R.

In another example, for resource element (RE) level cycling or partial slot level cycling, the UE 401 determines the precoder(s) based on a number of ports for each rank.

To reduce the overhead of the precoded SRS, a precoder(s) of lower rank can be included in/with higher rank precoder(s).

The gNB 402 receives the transmission 410 and measures the plurality of SRS. The gNB 402 determines a signal quality for each SRS based on the measured SRS and ranks the received SRS. Each SRS has an associated signal quality based on the environment, assigned precoder, and the like. The gNB 402 ranks the SRS based on the associated signal quality. Some examples of determining the rank or ranking of the received SRS are provided below.

The gNB 402 determines rank or rankings for the one or more precoder(s) and the configured ports and allocates UL data resource at 412. The gNB 402 informs the UE 401 of the determined rank at 414. The gNB 402 can use higher layer signaling and/or control information to convey the determined ranks. In one example, the SRS having the best or highest signal quality is ranked as the highest or best SRS.

The UE 401 receives the determined rank and/or rankings and selects a precoder for data transmission based on the determined rankings at 416. In one example, the UE 401 selects the data transmission precoder associated with the highest ranked SRS. The UE can also select other UE resources, such as UE antenna port, associated with the highest ranked SRS.

The UE 401 transmits UL data at 418 with using the data transmission precoder determined from the SRS rank or ranking. The same precoder used in SRS transmission should be used for the uplink data transmission. The data transmission 418 can be in a physical uplink shared channel (PUSCH) and the like.

An example of a suitable technique to determine the rank of maximum number of ports for precoded SRS is to determine the rank based on the reference signal received power (RSRP). Then when the below two conditions are true, the rank j precoded SRS can be enabled.

$RSRP-RSRP_j>\Delta_j$ $j<\min (N_{tx}, N_{rx})$

Where $RSRP_j$ and $\Delta_j$ can be pre-defined or configured via higher layer signaling; $N_{tx}$ indicates the number of transmission antenna ports; $N_{rx}$ denotes the number of receiving antenna ports.

In another example, if the low rank of precoder is not a sub-set of the high rank precoder, the UE 401 can transmit the precoded SRS at the same time or different time.

In one example, the UE 401 can transmit the precoded SRS with different access point (AP) index simultaneously. The different APs can be multiplexed in a frequency division multiplexing-ed (FDMed) manner. In one example, a Resource Block (RB) 1 in one Resource Block Group (RBG) can be used to transmit the SRS with rank 1 precoder and RB 2 in the same RBG can be used to transmit precoded SRS with rank 2 precoder.

In another option, the precoded SRS with a different rank of precoders can be multiplexed in time division manner. The precoded SRS with different rank of precoders can be transmitted in different symbols or slots.

The rank of precoded SRS and/or associated precoder(s) can be configured via the DCI. A bit-map of rank of the precoder can be indicated via the DCI, and the length of the bit-map can be determined by the maximum rank, e.g. it can be equal to the maximum rank plus 1. Each bit can be used to indicate whether the precoded SRS with that rank should be transmitted, where value 0 may indicate that rank of precoded SRS is not enabled and value 1 may indicate it is enabled. Thus, the UE 401 can be provided with a rank that enables some precoders and disables other precoders.

In another example, a non-precoded SRS and precoded SRS can be used to determine the precoder and transmission scheme. The UE 401 can transmit the non-precoded SRS and then the gNB 402 can determine the transmission scheme as well as the rank of precoder based on the non-precoded SRS and the precoded SRS. Then, the gNB 402 can configure the transmission scheme used by the UE 401 and the rank of precoder for precoded SRS via the DCI or higher layer signaling.

In one option, the non-precoded SRS and precoded SRS can be configured by independent DCI. In another option, an indicator can be added in the DCI to configure whether the SRS is to be precoded or non-precoded. In another option, the indication of SRS type, such as precoded or non-precoded, can be jointly coded with other indicator, such as transmission and/or rank of a precoder.

Figure 5:
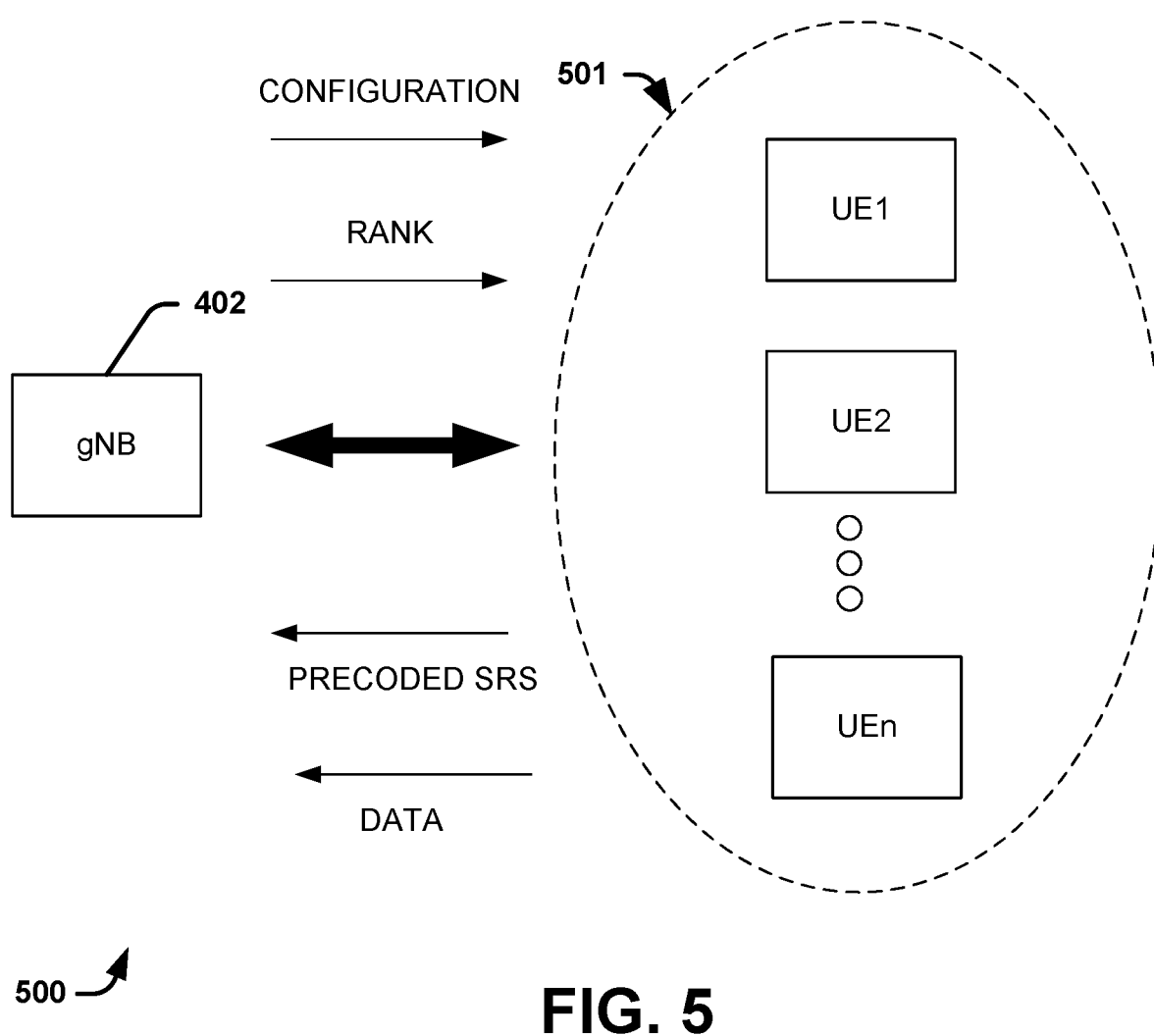
FIG. 5 is a diagram illustrating an architecture of a system utilizing non-codebook precoders for uplink transmissions in accordance with some embodiments.

FIG. 5 is a diagram illustrating an architecture of a system 500 utilizing non-codebook precoders for uplink transmissions in accordance with some embodiments. The system 500 includes functions or operations implemented by circuitry, such as the baseband circuitry 204. The system 500 is provided for illustrative purposes and it is appreciated that additional components/elements can be included and/or omitted. Further, the system 500 can incorporate the system 400 and/or be used with the system 100, described above.

The system 500 can be implemented within a node, such as an eNB, gNB, UE device, network node, and the like for communication or interaction with another node.

A node (gNB) 402 generates a bundling configuration for a group or cell of user equipment (UE) devices 501. The group can include a UE device, such as the UE device 401, shown above. In one example, the group includes n UE devices.

The UE devices 501 and/or the node 402 determine one or more precoders to use for uplink data transmission. The one or more precoders can be selected from a set of available precoders, based on a transmission scheme, and the like. In one example, the node 402 determines the one or more precoders. In another example, each of the UE devices 501 determines associated one or more precoders as the one or more precoders. In another example, the node 402 determines only a portion of the one or more precoders.

The UE devices 501 generate a plurality of SRS or other reference signals based on the one or more precoders. The plurality of SRS are also referred to as precoded SRS.

The node 402 ranks the plurality of SRS and/or associated precoders based on, for example, signal strength and/or other quality indicators derived from measuring the plurality of SRS. The rank or determined rank/ranking is provided to the UE devices 501. In one example, the highest or best ranked precoder is provided as the ranking.

The UE devices 501 selects or identifies a data uplink precoder based on the rank from the node 402. The data uplink precoder can be selected as the highest or best ranked precoder of the one or more precoders.

The UE devices 501 can utilize their selected data uplink precoder to use and generate an uplink data transmission.

The UE devices 501 also use demodulation reference signals (DMRS) to generate the uplink data transmission.

It is appreciated that suitable variations of the system 500 are contemplated.

Figure 6:
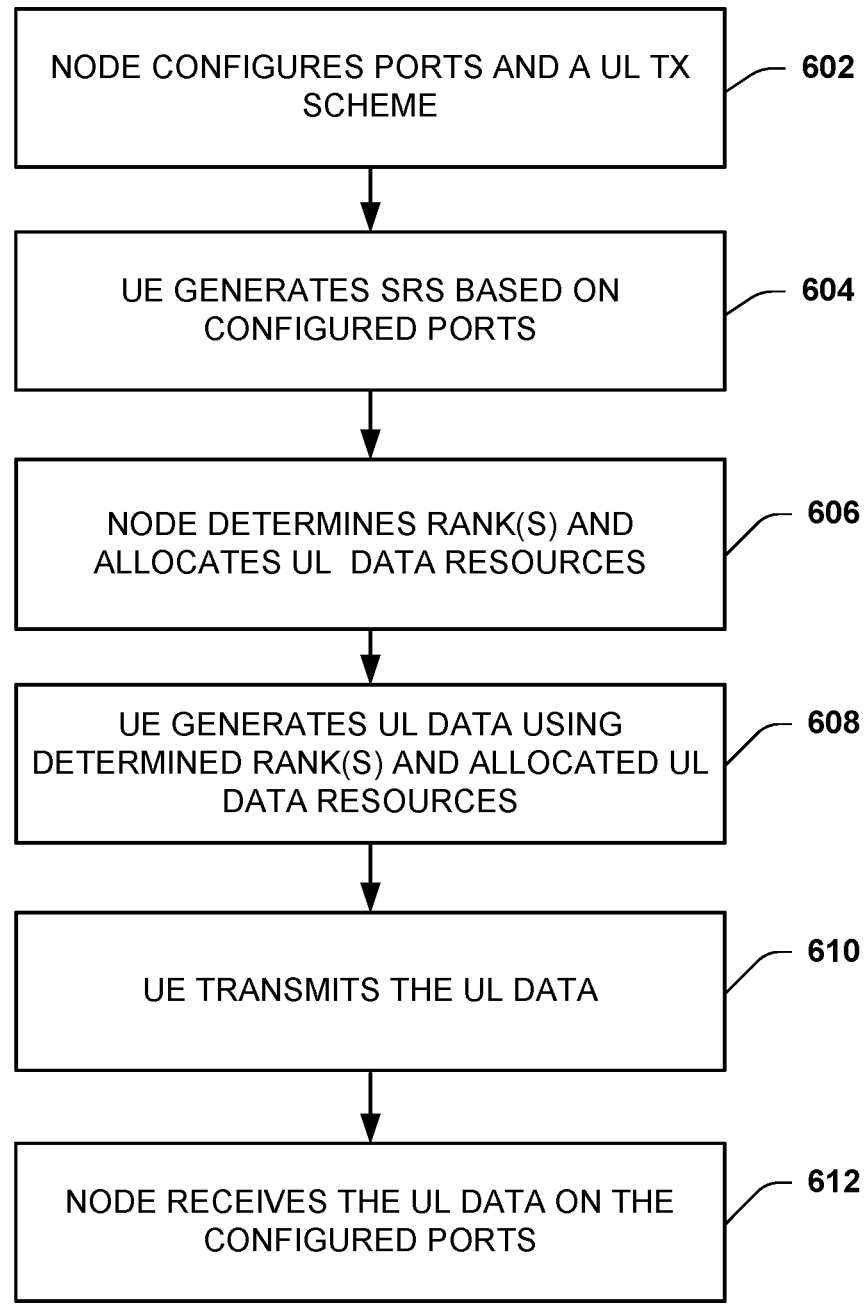
FIG. 6 is a flow diagram illustrating a method using non-codebook rankings to select a precoder for uplink transmissions in accordance with some embodiments.

FIG. 6 is a flow diagram illustrating a method 600 using non-codebook rankings to select a precoder for uplink transmissions in accordance with some embodiments. The method 600 facilitates communication and resource allocation for one or more user equipment (UE) devices or nodes. The nodes can be associated with a cell and a base station or other node.

The method or process 600 is described with reference to a UE device and a node (gNB), however it is appreciated that other device and/or nodes can be used. For example, the node can be other types of nodes, such as an eNB, gNB and the like. The method 600 can be implemented using the above systems, arrangements and variations thereof.

The gNB configures a number of SRS antenna ports and a transmission scheme for uplink communication/transmission at block 602.

The UE device generates a plurality of sounding reference signals (SRS) using one or more precoders at block 604. The UE device can generate the SRS or precoder based SRS using the configured ports.

Additionally, the UE device can select/determine some or all of the one or more precoders as shown above. Alternatively, the one or more precoders can be at least partially determined by the gNB and/or other network devices. Additionally, the one or more precoders can be pre-determined, from a set of available precoders, dynamically determined, dynamically determined based on the configured transmission scheme and/or the like.

The gNB ranks the SRS and/or their associated precoders at block 606. The gNB can also allocate resources for uplink transmission/communication, including frequency and time resources. The gNB can measure the SRS to determine a quality or channel quality for each of the SRS. The gNB then ranks the SRS and associated precoders according to the determined qualities.

The UE selects or uses an identified uplink precoder based on the rank from the gNB and generates uplink data using the uplink precoder at block 608. In another example, the rank provided by the gNB is the selected/identified precoder for the uplink data.

The UE device transmits the uplink data using the allocated resources and the identified precoder at 610. In one example, the uplink data is transmitted as a physical shared uplink channel (PUSCH). The transmission can also use the configured ports.

The node receives the uplink data using the identified precoder at block 612. The node can use the configured ports to receive the uplink data transmission.

The method 600 can be repeated and/or re-utilized for additional channels, additional data and the like. It is appreciated that suitable variations of the method 600 are contemplated.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a base station. The apparatus comprises baseband circuitry which includes a radio frequency (RF) interface and one or more processors. The one or more processors are configured to generate control information, the control information including a configured number of ports; receive a plurality of sounding reference signals (SRS) via the RF interface from a user equipment (UE) device, wherein each of the plurality of SRS is associated with one of the one or more precoders; and generate a ranking of a the one or more precoders based on the received plurality of SRS, wherein the plurality of SRS are associated with the one or more precoders and/or each of the plurality of SRS can be associated with one of the one or more precoders.

Example 2 includes the subject matter of Example 1, including or omitting optional elements, wherein the one or more processors are further configured to measure each of the plurality of SRS and obtain a plurality of SRS measurements.

Example 3 includes the subject matter of any of Examples 1-2, including or omitting optional elements, wherein the one or more processors are further configured to determine a plurality of signal qualities based on the plurality of SRS measurements and wherein the ranking is based on the plurality of signal qualities.

Example 4 includes the subject matter of any of Examples 1-3, including or omitting optional elements, wherein the control information is transmitted to the UE device via the RF interface.

Example 5 includes the subject matter of any of Examples 1-4, including or omitting optional elements, wherein the control information is provided to the UE device using higher layer signaling.

Example 6 includes the subject matter of any of Examples 1-5, including or omitting optional elements, wherein the control information includes a transmission scheme.

Example 7 includes the subject matter of any of Examples 1-6, including or omitting optional elements, wherein the transmission scheme is a diversity based transmission scheme.

Example 8 includes the subject matter of any of Examples 1-7, including or omitting optional elements, further comprising receiving an uplink data transmission from the UE device via the RF interface, wherein the uplink data transmission uses an identified precoder of the one or more precoders.

Example 9 includes the subject matter of any of Examples 1-8, including or omitting optional elements, wherein the one or more processors are further configured to allocate uplink resources.

Example 10 includes the subject matter of any of Examples 1-9, including or omitting optional elements, wherein the ranking is at least partially based on a reference signal received power (RSRP).

Example 11 is an apparatus configured to be employed within a user equipment (UE) device comprising baseband circuitry. The baseband circuitry includes a radio frequency (RF) interface and one or more processors. The one or more processors are configured to identify one or more bundles from the one or more downlink transmissions based on a hybrid automatic repeat request-acknowledge (HARQ-ACK) bundling configuration; generate HARQ-ACK feedback based on the HARQ-ACK bundling configuration for the one or more bundles; and provide the HARQ-ACK feedback to the RF interface for transmission to a base station.

Example 12 includes the subject matter of Example 11, including or omitting optional elements, wherein the one or more processors are further configured to receive a ranking of the plurality of precoders, wherein the ranking is based on the generated plurality of reference signals.

Example 13 includes the subject matter of any of Examples 11-12, including or omitting optional elements, wherein the one or more processors are further configured to determine an uplink data precoder from the plurality of precoders based on the received ranking.

Example 14 includes the subject matter of any of Examples 11-13, including or omitting optional elements, wherein the one or more processors are further configured to generate uplink data using the determined uplink data precoder.

Example 15 includes the subject matter of Examples 11-14, including or omitting optional elements, wherein the one or more processors are further configured to provide the generated uplink data to the RF interface for transmission to the gNB.

Example 16 includes the subject matter of any of Examples 11-15, including or omitting optional elements, further comprising obtaining the one or more precoders from the gNB.

Example 17 includes the subject matter of any of Examples 11-16, including or omitting optional elements, further comprising obtaining a transmission scheme from the gNB.

Example 18 includes the subject matter of any of Examples 11-17, including or omitting optional elements, wherein at least one of the plurality of reference signals are not based on a precoder.

Example 19 includes the subject matter of any of Examples 11-18, including or omitting optional elements, wherein the plurality of reference signals are sounding reference signals (SRS).

Example 20 is one or more computer-readable media having instructions that, when executed, cause a base station to configure a number of ports for uplink transmission; configure a precoding resource group (PRG) size, wherein the PRG size is a number of adjacent physical resource blocks (PRB) that can used for channel estimation; configure one or more precoders for uplink transmission; and send control information including the configured number of ports, the PRG size and the one or more precoders to a user equipment (UE) device.

Example 21 includes the subject matter of Example 20, including or omitting optional elements, wherein the instructions, when executed, further cause the base station to receive a plurality of reference signals from the UE device based on the one or more precoders.

Example 22 includes the subject matter of any of Examples 20-21, including or omitting optional elements, wherein the instructions, when executed, further cause the base station to generate a ranking of the one or more precoders based on the received plurality of reference signals.

Example 23 is an apparatus configured to be employed within a user equipment (UE) device. The apparatus includes a means to obtain a plurality of precoders for uplink transmission; a means to generate a plurality of reference signals using the plurality of precoders; a means to receiving a ranking of the plurality of precoders from a base station, wherein the ranking is based on the plurality of reference signals; and a means to select a data uplink precoder from the plurality of precoders based on the ranking.

Example 24 includes the subject matter of Example 23, including or omitting optional elements, further comprising a means to generate an uplink data transmission using the selected data uplink precoder.

Example 25 includes the subject matter of any of Examples 23-24, including or omitting optional elements, further comprising a means to receive an uplink resource allocation from the base station and use the received resource allocation for the generated uplink data transmission.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a base station (BS), comprising baseband circuitry having:
   a radio frequency (RF) interface; and
   one or more processors configured to:
      generate control information, the control information including a configured number of ports;
      receive a plurality of sounding reference signals (SRS) via the RF interface from a user equipment (UE) device, wherein each of the plurality of SRS is associated with one of one or more precoders, wherein the one or more precoders are applied to different frequency and subcarrier indices; and
      generate a ranking of the one or more precoders based on the received plurality of SRS, wherein the plurality of SRS are associated with one of the one or more precoders, and wherein the ranking is at least partially based on a bit-map where the bit-map is based on a maximum rank of the precoders, and the bit-map indicates one or more of the precoders that are enabled and disabled.

2. The apparatus of claim 1, wherein the one or more processors are further configured to measure each of the plurality of SRS and obtain a plurality of SRS measurements.

3. The apparatus of claim 2, wherein the one or more processors are further configured to determine a plurality of signal qualities based on the plurality of SRS measurements and wherein the ranking is based on the plurality of signal qualities.

4. The apparatus of claim 1, wherein the control information includes a semi-open loop transmission scheme, and wherein the one or more processors are further configured to generate a wideband precoder.

5. The apparatus of claim 4, wherein the one or more processors are further configured to determine the wideband precoder from the one or more precoders to apply different co-phase values to different polarized antennas for different frequency and subcarrier indices.

6. The apparatus of claim 1, further comprising receiving an uplink data transmission from the UE device via the RF interface, wherein the uplink data transmission uses an identified precoder of the one or more precoders.

7. The apparatus of claim 1, wherein the one or more processors are further configured to allocate uplink resources.

8. The apparatus of claim 1, wherein the ranking is at least partially based on a reference signal received power (RSRP).

9. The apparatus of claim 1, wherein the BS provides the ranking that enables some precoders and disables other precoders via a downlink control information (DCI) signaling.

10. An apparatus for a user equipment (UE) device, comprising baseband circuitry having:
    a radio frequency (RF) interface configured to receive one or more downlink transmissions from a base station (BS); and
    one or more processors configured to:
       determine a plurality of precoders and apply one or more of the plurality of precoders to different frequency and subcarrier indices;
       generate a plurality of reference signals for the plurality of precoders;
       provide the plurality of reference signals to the RF interface for transmission to the BS; and
       receive a ranking of the plurality of precoders, wherein the ranking is based on the generated plurality of reference signals wherein the received ranking of the plurality of precoders includes a bit-map based on a maximum rank of the precoders, and the bit-map indicates one or more of the precoders that are enabled and disabled.

11. The apparatus of claim 10, wherein the one or more processors are further configured to determine an uplink data precoder from the plurality of precoders based on the received ranking.

12. The apparatus of claim 11, wherein the one or more processors are further configured to generate uplink data using the determined uplink data precoder.

13. The apparatus of claim 10, further comprising obtaining the plurality of precoders from the BS.

14. The apparatus of claim 10, further comprising obtaining a semi-open loop transmission scheme and a wideband precoder from the BS.

15. The apparatus of claim 14, wherein the UE device determines the wideband precoder from the plurality of precoders to apply different co-phase values to different polarized antennas for different frequency and subcarrier indices.

16. The apparatus of claim 10, wherein the plurality of reference signals are sounding reference signals (SRS).

17. One or more non-transitory computer-readable media having instructions that, when executed, cause a base station (BS) to:
configure a number of ports for uplink transmission;
configure a semi-open loop transmission scheme;
configure a precoding resource group (PRG) size, wherein the PRG size is a number of adjacent physical resource blocks (PRB) that can used for channel estimation;
configure one or more precoders, including a wideband precoder, for uplink transmission;
receive a plurality of reference signals from a user equipment (UE) device based on the one or more precoders;
generate a ranking of the one or more precoders based on the received plurality of reference signals, and wherein the ranking is at least partially based on a bit-map where the bit-map is based on a maximum rank of the precoders, and the bit-map indicates one or more of the precoders that are enabled and disabled; and
send control information including the configured number of ports, the PRG size, the one or more precoders, and the ranking of the one or more precoders to the user equipment (UE) device.

18. The non-transitory computer-readable media of claim 17, wherein
the ranking is partially based on a reference signal received power (RSRP) where precoders are enabled and disabled as a function of the RSRP, a reference signal associated with one of the one or more precoders, and a minimum number of a plurality of transmission and receive ports.

* * * * *